United States Patent [19]
Futral

[11] Patent Number: 5,638,515
[45] Date of Patent: Jun. 10, 1997

[54] METHOD FOR STRIPPING DATAFRAMES FROM THE COMMUNICATING MEDIUM IN AN FDDI COMMUNICATIONS NETWORK

[75] Inventor: William T. Futral, Hillsboro, Oreg.

[73] Assignee: Ungermann-Bass, Inc., Santa Clara, Calif.

[21] Appl. No.: 474,992

[22] Filed: Jun. 7, 1995

Related U.S. Application Data

[62] Division of Ser. No. 939,777, Sep. 3, 1992, Pat. No. 5,568,613.

[51] Int. Cl.⁶ .................................................. H04L 12/46
[52] U.S. Cl. ........................... 395/200.11; 395/200.17; 395/854; 370/402; 370/456
[58] Field of Search ..................... 395/200.11, 200.1, 395/854, 200.17; 370/85.5, 85.14; 340/825.06

[56] References Cited

U.S. PATENT DOCUMENTS

| | | | |
|---|---|---|---|
| 4,737,953 | 4/1988 | Koch et al. | 370/94 |
| 4,811,203 | 3/1989 | Hamstra | 364/200 |
| 4,853,921 | 8/1989 | Takeda | 369/59 |
| 4,922,503 | 5/1990 | Leone | 370/85.13 |
| 4,926,420 | 5/1990 | Shimizu | 370/94.1 |
| 4,967,353 | 10/1990 | Brenner et al. | 364/200 |
| 5,125,085 | 6/1992 | Phillips | 395/400 |
| 5,136,580 | 8/1992 | Videlock et al. | 370/60 |
| 5,224,096 | 6/1993 | Onishi et al. | 370/85.5 |
| 5,245,606 | 9/1993 | DeSouza | 370/85.13 |
| 5,321,695 | 6/1994 | Faulk, Jr. | 370/94.1 |
| 5,377,190 | 12/1994 | Yang et al. | 370/85.5 |
| 5,481,538 | 1/1996 | Yang et al. | 370/85.5 |

OTHER PUBLICATIONS

"Frame Content Independent Stripping for Token Rings", Ramakrishnan et al, IEEE, pp. 405–415. 1990.

*Primary Examiner*—Thomas C. Lee
*Assistant Examiner*—Rehana Perveen Krick
*Attorney, Agent, or Firm*—Townsend and Townsend and Crew

[57] ABSTRACT

A dataframe filter is provided a local area network bridge to monitor the dataframes transmitted on one network to determine those dataframes destined to be communicated to another network by the network bridge. The filter receives and examines the destination address of each dataframe communicated on the one filter and, searching through a database maintained by the filter, determine whether the destination address is located on the second network and, if so, signals the bridge to copy the dataframe to the second network.

10 Claims, 3 Drawing Sheets

DATA FRAME STRUCTURE

RECORD STRUCTURE

METHOD FOR STRIPPING DATAFRAMES FROM THE COMMUNICATING MEDIUM IN AN FDDI COMMUNICATIONS NETWORK

This is a division of application Ser. No. 07/939,777 filed Sep. 3, 1992 now U.S. Pat. No. 5,568,613.

BACKGROUND OF THE INVENTION

The present invention relates generally to data communication networks, and specifically to an improved local area network bridge unit for transferring data communications originating on a first network to a second network.

In local area data communications network topologies, it is often necessary or advantageous to couple two separate communications networks, each having a plurality of dataframe originating and receiving stations, to one another by a network bridge unit. In the most simplistic design the network bridge unit operates to copy all dataframes originating on one network to the other. Thus, each network sees all dataframes that are transmitted on either network.

However, as the number of stations on one or both of the networks increase, the dataframe traffic can overload such a simplistic design and, therefore, it is often necessary to provide the network bridge unit with circuitry to monitor the dataframe traffic on either of the networks, transporting only those dataframes from one network specifically designated for a receiving station located on the other network. Thus, microprocessor-based network bridge units are used to provide "filtering," in the sense that dataframes communicated on a network bound for stations on that same network are "filtered" from those that are to be transported to the other network.

The filter operation depends upon use of identification (ID) information contained in the dataframes transmitted. Common dataframe protocol specifies that the dataframe contain the ID of the station or node from which the dataframe originated, as well as the ID of the destination node. In this way, the network bridge unit can receive the dataframe, extract the destination ID, and determine therefrom whether the dataframe is to be transported from the network on which it was first communicated to the other network.

As available technology increases the available bandwidth on networks, more nodes can be connected or coupled to a network, significantly increasing the traffic, and the rate of traffic. Thus, for example, in FDDI (ANSI X3T9.5) local area networks, 100 megabit data rates are not uncommon. In order to meet the necessary timing requirements for small dataframes, a network bridge unit is severely put upon to perform the necessary comparison in a very small amount of time. This places a severe requirement upon microprocessor-based network bridge units, requiring either expensive, high performance microprocessors, or some other approach.

SUMMARY OF THE INVENTION

The present invention is directed to a dataframe filter unit that forms a part of a network bridge unit to provide a fast, efficient technique for determining which of the dataframes originating on one of two (or more) communications networks are bound for destination nodes located on the other communications network via the network bridge unit.

In accordance with the present invention, each station on a local area network is assigned a 48-bit identification (ID), known as the Node ID. Communications on a network is in the form of dataframes containing a Node ID for both the source (i.e., originating) node and the node to which the dataframe is destined (the destination node). Dataframes that originate on one network bound for a destination on another network are received by a media access controller of the connecting network bridge unit. The media access controller for that network will, under command and control of a supervisor processor, transfer the received dataframe to the media access controller for the network containing the destination of the dataframe where it (the dataframe) is then transmitted onto the destination network.

Generally, the present invention is directed to a dataframe filter unit that incorporates, for each network to which the associated network bridge unit connects, a state machine-based memory structure capable of heuristically building and maintaining a database of source node ID's for associated network. Dataframes that are transmitted on that network are examined by the filter unit, first comparing the destination node ID to the content of the database. If no comparison is found, the dataframe is assumed to be destined for the other network to which the network bridge is coupled, and is copied to the media access controller of the bridge unit for that other network. Next, the source node ID of the dataframe is captured and the database again searched for a comparison, this time using the source node ID. If no comparison is found, indicia of the source node ID stored in the database.

If, alternatively, the comparison of the destination node ID with the content of the database reveals that the destination node is on the same network as that of the source node, the dataframe is disregarded. The source node ID of the dataframe is, however, still compared to the database content to add the node ID if nor already in the database. The process of comparing the source node ID of a dataframe to the content of the database, and adding indicia of the ID if not found, is the "learning" process used by the present invention to heuristically build the database.

Each entry of the database includes a field containing information as to that entry's "age" i.e., an indication of the time since the entry was last used. Each time the database is searched using the source node ID of a dataframe, this age entry is updated (if the entry is found), or added (when the ID is added to the database). Then, periodically, the database is sequenced through, record-by-record, and those records whose age field has not been updated within a predetermined period of time are deleted.

It should be evident to those skilled in this art that the present invention provides a number of advantages not heretofore available. First, using state machine circuitry dedicated to performing the filter functions described above permits the associated network bridge unit to operate in very high data rate transmission environments such as, for example, FDDI local area networks without fear of overloading the supervisory processor of the bridge unit.

Further, by providing the filter unit of the present invention with a heuristic learning ability to construct the database permits the bridge unit to operate with networks that are periodically changed (by addition or removal of nodes) without manual intervention. The capability of removing "aged" entries from the database adds to this advantage.

These and other features and advantages of the present invention will become apparent to those with ordinary skill in this art upon a reading of the following detailed description of the invention, which should be taken in conjunction with the accompanying drawings.

DETAILED DESCRIPTION OF THE INVENTION

Figure 1:
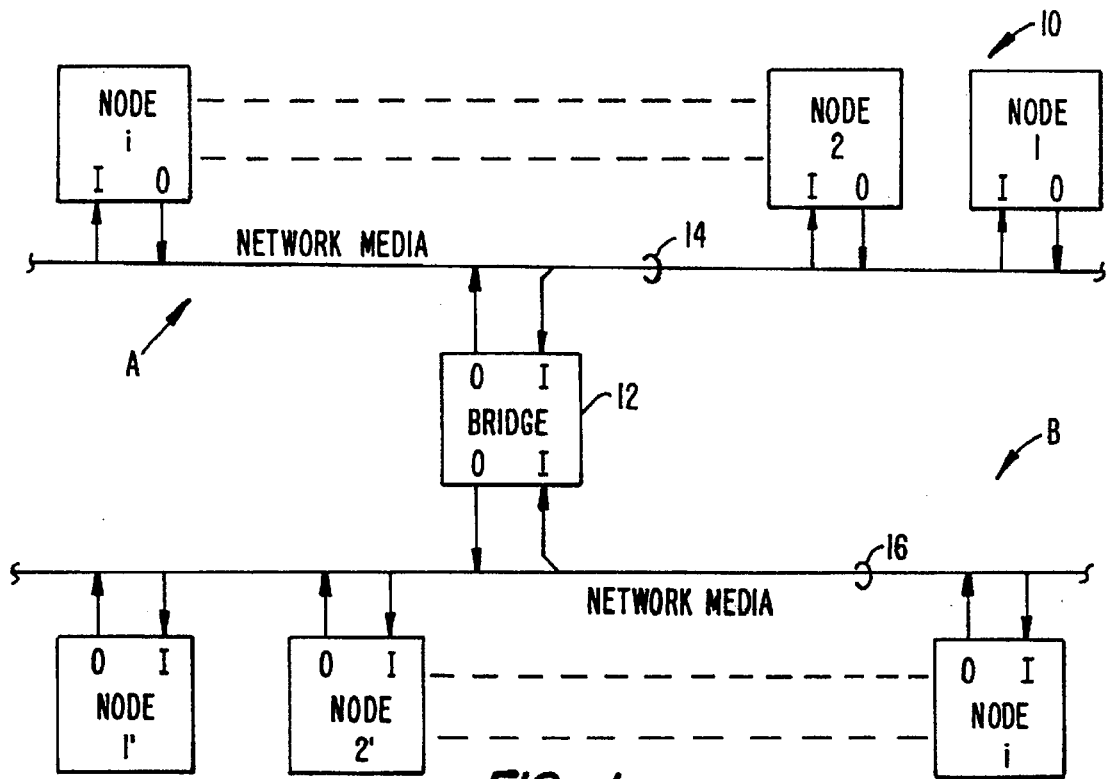
FIG. 1 is an illustration of a data communications network in which a bridge unit, constructed to incorporate the filter unit of the present invention, interconnects a network A to a network B.

Turning now to the figures, and for the moment FIG. 1, there is illustrated a data communication network, designated with the reference numeral 10, and including a local area network A and a local area network B interconnected by a bridge 12.

As FIG. 1 illustrates, the network A includes a network media 14 that interconnects a number of stations or nodes 1, 2, . . . ,i, which can be any type of digital processing unit such as, for example, printers, workstations, communication nodes, and even bridges to other networks. In similar fashion, the network B of the system 10 interconnects nodes 1', 2', . . . ,i' via a network media 16. The network media 14 and 16 similarly connect the respective nodes to the bridge unit 12.

Preferably, the network system 10 utilizes FDDI protocol and, therefore, each node, as well as each media connection to the bridge 12, includes an input port (I) and an output port (O) that connects to the network media 14 and 16. Data is placed on the network media 14, 16 from an output port O of a node or the bridge unit 12, and received at a respective input port I.

Figure 3:
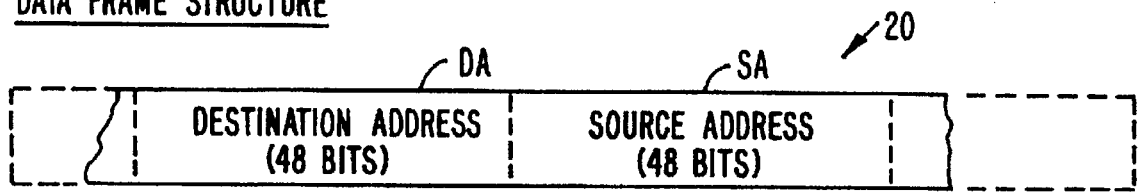
FIG. 3 is a diagrammatic illustration of the structure and content of dataframes communicated on the data communications network illustrated in FIG. 1.

When using FDDI (or similar) protocol, data typically is communicated in packets or dataframes, such as the dataframe 20 illustrated in FIG. 3. Included in the dataframe 20 is a 48-bit field containing a destination address (DA) that identifies the node for which the dataframe is bound. Similarly, another 48-bit field of the dataframe 20 contains a source address (SA) identifying the node from which the packet 20 originated. Other fields (not specifically shown) of the dataframe 20 would contain data and/or instructions, some form of error-check or correction code, and perhaps other information, all of which is not relevant to the understanding of the present invention.

Dataframes communicated on the network A bound for one of the nodes 1, 2, . . . ,i will be received by the destination node when it (the destination node) recognizes its designated address in the DA field of the transmitted dataframe. If, however, the dataframe 20 is transmitted, for example by node 2 on network A, with a destination address identifying, for example, node 1' on network B, it is the responsibility of the bridge unit 12 to monitor the data communications on the network media 14 and to recognize, from the DA field of the transmitted dataframe, that node 1' is not on network A and thus is on network B. When so recognized, the bridge unit 12 will temporarily receive and store the dataframe 20, copying or retransmitting it onto the network media 16 of the network B for receipt by the node 1'.

Figure 2:
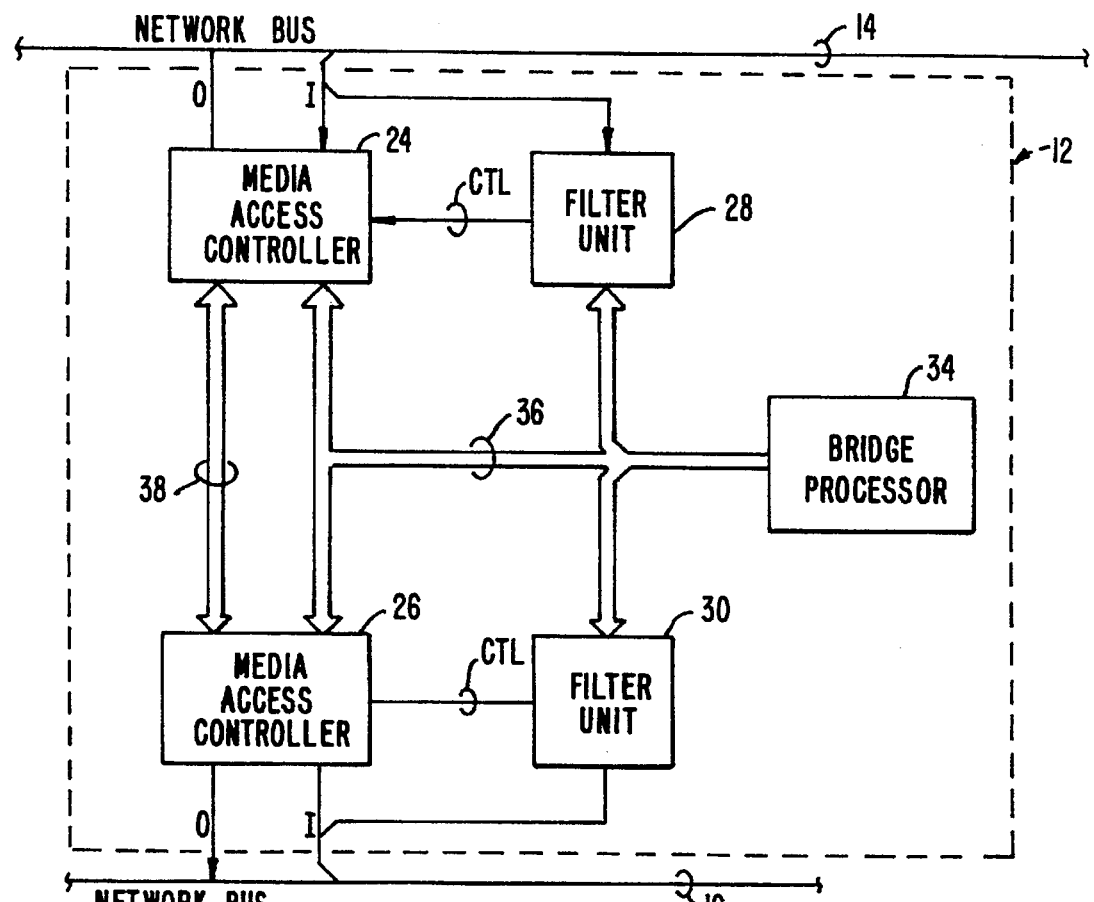
FIG. 2 is a block diagram of the structure of the bridge shown in FIG. 1, illustrating incorporation of the filter unit of the present invention.

Turning now to FIG. 2, the major units of the bridge unit 12 are illustrated. As FIG. 2 shows, the bridge unit 12 includes a pair of media access controllers 24, 26, each having input ports (I) and output ports (O) connected to the corresponding ones of the network media 14, 16, respectively. Associated with each media access controller 24, 26 is a filter unit 28, 30, each coupled to receive the network media 14, 16, respectively. Supervisory control over the media access controllers 24, 26 and the filter units 28, 30 is provided by a bridge processor 34 that interconnects with the other elements of the bridge 12 by a control bus 36. A two-way data bus 38 interconnects the media access controllers 24, 26 for communicating dataframes bound from one of the networks A, B, as received by the corresponding media access controller, to the other network.

Briefly, the bridge unit 12 operates generally as follows. Assume that one of the nodes 1, 2, . . . i of the network A forms a dataframe 20 destined for one of the nodes 1', 2', . . . ,i' of network B, and communicates the dataframe on the network media 14. As indicated above, the destination of the dataframe 20 will be identified by the content of the destination address field, DA. As the dataframe 20 is transmitted onto the network media 14, the media access controller 24 will similarly begin receiving and storing the dataframe. The associated filter unit 28 will also receive and temporarily store the destination and source address fields DA, SA, and from that information determines which of the networks A, B contains the destination node. If the destination node of the dataframe is in network A, the same network from which it is being received, the filter unit 28 will terminate the copy operation (storing of the dataframe) of the media access controller since no further action on behalf of the bridge 12 is needed or taken if, however, the filter unit 28 determines that the destination node is contained in network B, it will so signal the media access controller 24, via signalling carried on control lines CTL. The media access controller 24 will continue to receive and store the dataframe 20, subsequently communicating it to the media access controller 26, via the data bus 38, for retransmission onto the network media 16 of the network B for receipt by the destination node.

Figure 4:
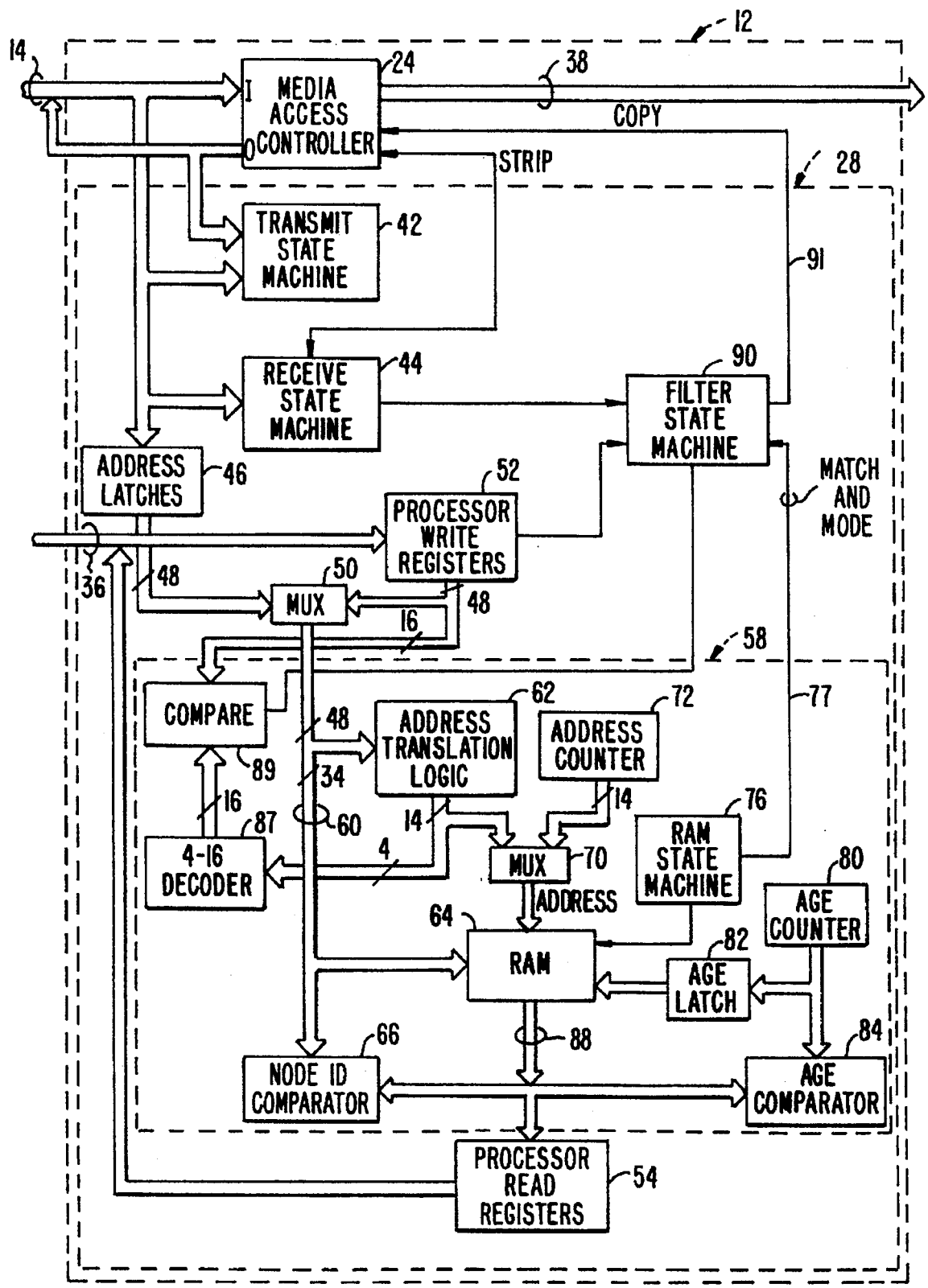
FIG. 4 is a block diagram of the structure of the filter unit of the present invention.

The filter unit 28 is shown in greater detail in FIG. 4. The filter unit 30 is of substantially identical construction so that a discussion of the filter unit 28 should be taken as applying equally to the filter unit 30.

Turning then to FIG. 4, the filter unit 28 is shown as including a transmit state machine 42 coupled to the network media 14 (FIG. 1) to receive the dataframes communicated thereon. Also coupled to receive the network media 14 is a receive state machine 44 and address latches 46.

The address latches 46 are, in turn, coupled to a multiplexer (MUX) 50 which operates to select between a 48-bit address supplied by the address latches 46 or a 48-bit address from processor write registers 52.

The processor write registers 52 are an assemblage of registers, latches, and flip-flops that are written, via the control bus 36, by the bridge processor 34 (FIG. 2). The information written to the processor write registers 52 direct control of the filter unit 28, establishing its mode of operation. In similar fashion, the bridge processor 34 can monitor operation of the filter unit 28 by reading information from processor read registers 54 (via the control bus 36) that are, in turn, written by the elements of the filter unit 28. As to the information written to, and read from, the processor write and read registers 52, 54, more will be said about them below.

The 48-bit quantity selected by the MUX 50 forms an address bus 60 that communicates the selected address to address translation logic 62, the data input of a random access memory (RAM) 64, and a node ID comparator 66—all contained in a memory system 58.

The address translation logic 62 operates to translate or "hash" the 48-bit address received from the MUX 50 to a 14-bit address that is supplied to a multiplexer (MUX) 70. MUX 70 selects between the 14-bit address supplied by the address translation logic 62 and a 14-bit address counter 72, to supply a 14-bit base address to the address circuitry (not shown) of the RAM 64.

Overall operation of the RAM 64, and its supporting elements such as the address translation logic 62, the address counter 72, and the MUX 70, are controlled by a RAM state machine 76. As will be seen, the RAM 64 contains a database that is capable of being quickly searched, using the content of the destination address field, DA, of a dataframe to determine for which of the networks A, B the dataframe is meant. The particular structure of the database, as will be also described below, permits fast access so that the determination can be made as quickly as possible. Further, each of the database records is, in effect, "time stamped" so that aged entries can be discarded, leaving room for newer entries. This feature allows for reconfiguring the network (i.e., moving stations or reconnecting bridges) as well as deleting those entries "learned" in error. This time stamp operation is implemented by an age counter 80, age latch 82, and age comparator 84, under control of the RAM state machine 76 and filter state machine 90.

The RAM 64 is coupled to an output memory bus 88 that communicates the accessed contents of the RAM 64 to the node ID comparator 66, the processor read registers 54, and the age comparator 84.

Overall control of the filter unit 28 is effected by the filter state machine 90.

Briefly, dataframes that are transmitted on the network media 14 by any one of the nodes 1, 2, . . . ,i are initially copied by the media access controller 24 and by the filter unit 28, which first loads, under control of the receive state machine 44, the 48-bit destination address (DA) of the dataframe in the address latches 46. When the DA is so temporarily stored, the filter state machine 90 will cause the content of the address latches 46 to be coupled, via the MUX 50, to the address translation logic 62 which, in turn, maps the 48-bit address to a 14-bit list address that identifies a group of x memory locations of the RAM 64; x is an integer, preferably a power of 2. For any given node ID on the network media 14 there is one and only one list with which that node is associated. The address translation algorithm implemented by the address translation logic 62 is structured in linear fashion so that 14 bits of the node ID (e.g., whether the DA or SA) is redundant and, therefore, not required to be stored in the database.

In the embodiment disclosed, x is 4, although it will be evident to those skilled in this art that x can be essentially any integer. Thus, only four records of the database need be searched, and each record content compared to the content of the address latches 46 (presently, DA) by the node ID comparator 66. If the comparison indicates that the identity of the destination node of the dataframe is contained in the database, the destination node is known to be located on the network media 14 and, therefore, is not to be transferred by the bridge 12 to the network B. The filter state machine 90 will so notify the media access controller 24, which in turn will halt its copy operation.

However, even though the media access controller 24 terminates its operation, the filter unit 28 continues, and receives the source address SA portion of the dataframe, which is then converted to a list address and used to access the RAM 64 to determine if the node originating the dataframe is identified in the database. If not, the RAM state machine 76 will write the node information into a empty record of the list identified by the converted SA, together with a time stamp provided by the age counter 80, via the age latch 82.

If, on the other hand, the source address SA is found in the database, the RAM state machine 76 will merely update the time stamp.

Thus, a search of the database implemented by the memory system 58 for a particular node ID address (e.g., SA or DA) requires only that a list address be generated by the address translation logic 62 from the SA or DA, and that only the four records of the list be analyzed (i.e., compared). This provides a very fast record search on very large databases. Also, since the records are in sequential order, there is no need for forward pointers to be stored as part of the database and no bandwidth is wasted interpreting those pointers.

Database Structure

Figure 5:
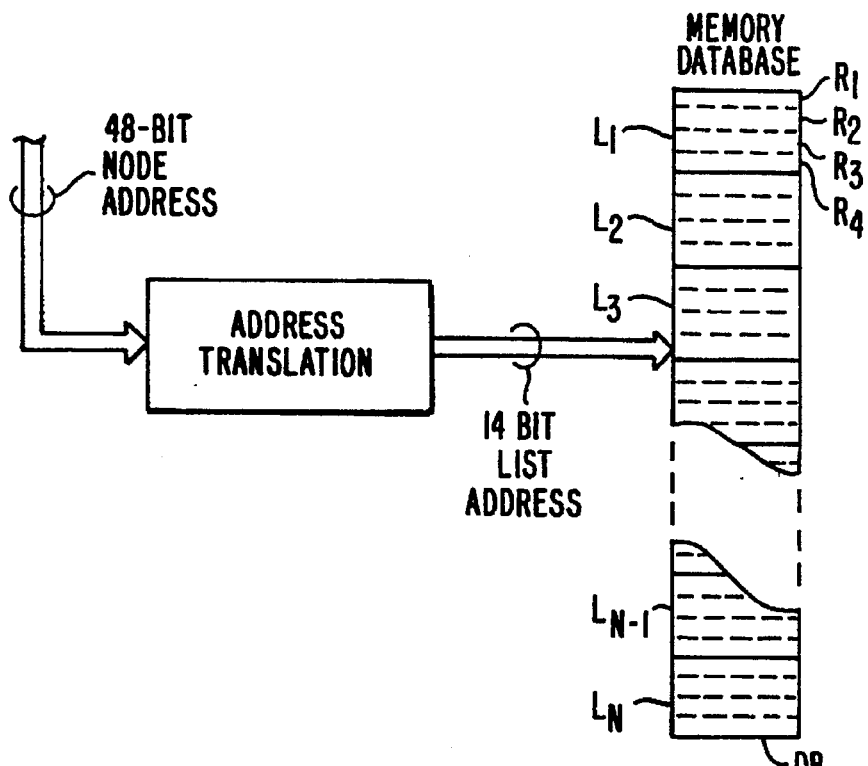
FIG. 5 is a diagrammatic illustration of the structure of the database constructed and maintained by the filter of the present invention.

With this brief, general description of the operation of the filter unit 28, a discussion of the database structure may now be better understood. Turning then to FIG. 5, a diagrammatic illustration of the database, designated generally with the reference DB is illustrated. The database DB is, of course, stored in the RAM 64, and includes a plurality of lists L (i.e., $L_1, L_2, \ldots, L_n$). Each list contains four records $R_1, R_4$ with each record maintaining information about each node of the network A.

Figure 6:
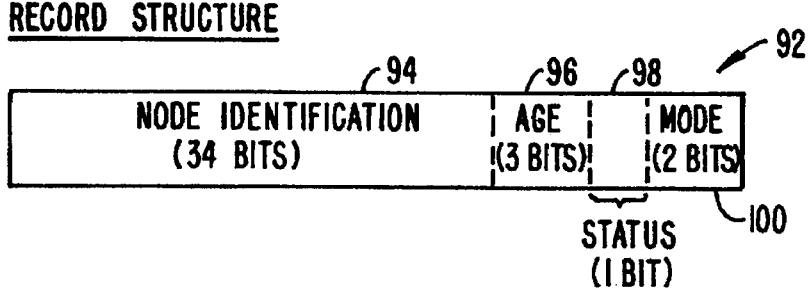
FIG. 6 is a diagrammatic illustration of a record of the database of FIG. 5.

The structure of each record, which is 40 bits long, is illustrated in FIG. 6, and designated with the reference numeral 92. Thus, as shown, each of the records 92 contained in the database DB include a 34-bit node identification field 94, a 3-bit age field 96, a 1-bit status field 98, and a 2-bit wide mode field 100. The node identification field 94 contains the information that is compared, by the node ID comparator 66, with 34 of the 48 bits of the SA or DA of the dataframe. The age field 96 contains a 3-bit value that is indicative of the age of the record since last accessed in response to an SA value from the address latches 46. The status field identifies whether the record is in use (e.g., by being set to a "1") or is empty (e.g., set to a "0") and available for receiving node ID information.

Detailed Operation

When a dataframe is transmitted by one of the nodes 1, 2, . . . ,i of the network A on the network media 14, the receive state machine 44 will detect the start of the frame and generate the necessary latching signals to first store the destination address DA of the dataframe in the address latches 46. When stored, a DA cycle request is made by the receive state machine 44 to the filter control state machine 90 which, in turn, will cause the MUX 50 to select the content of the address latches 46 to be applied to the address translation logic 62 where the 48-bit DA value is converted to a 14-bit list address. The 14-bit list address forms the most significant bits of a 16-bit address that is applied to the RAM 64. The two least significant bits are supplied by the RAM state machine 76, and are sequentially updated by one to search through the link list so accessed. Thus, while the fourteen bits derived from the 48-bit quantity from the address latches 46 point one of the record lists L of the database DB (FIG. 5), the least significant two bits supplied by the RAM state machine will identify which of the records R of the particular list L is accessed and applied to the node comparator 66.

The RAM state machine 76 will sequentially address (search) the next consecutive four records in the list L of the database DB for a match between the content of the node identification field 94 of the accessed record and the destination address DA contained in the address latches 46, as determined by the node ID comparator 66. If a match is found, the node comparator so notifies the RAM state machine 76 which, in turn, communicates that fact, together with the mode bits of the associated record, to the filter state machine 90 via the signal lines 77.

Next, the source address field, SA, of the dataframe is latched in the address latches 46, and applied to the address translation logic 62 (again, via the MUX 50) under control of the filter state machine 90. The 48-bit address is likewise converted to the fourteen bits that identify a 4-record list L of the database DB. Again, the RAM state machine 76 supplies the least significant bits that identify a record of the list, sequencing through the list until a match between the content of the node identification field 94 and a portion of the 48-bit source address SA is found, or the end of the list reached. If a match is found, the age field 96 is updated to the current value in the age latch 82. If no match is found, a flag (e.g., latch or flip-flop—not shown) in the filter state machine 90) is set to indicate that the content of the address latches 46 contain a source address not listed in the database DB, and must be added to the database if the frame is received without error. The update is postponed until after the frame check sequence and error indication has verified the frame (and thus the source address) is valid. This prevents a frame with a corrupted address from being "learned." Accordingly, if the frame is received without error, the contents of the address latches 46 is added to the database by writing the 34 bits of the content of the address latches 46 (i.e., the source address) into node identification field 94 of an empty record R, time stamping the record with the content of the age latch 82, setting the status bit to indicate the record is in use. The mode field will also be written to indicate a learned (dynamic) address, as will be explained below.

Frame Tracking and Stripping

As indicated above, the filter unit 28 (as is filter unit 30) is configured for a bridge unit 12 preferably operating on a FDDI (ANSI X3T9.5) network, although it is applicable to any local area network. However, when operating on an FDDI implemented network, the filter unit 28 undertakes the responsibility of monitoring transmissions on the network media 14 and for stripping dataframes from the network that have originated from the bridge unit 12 and have made the round through the nodes 1, . . . ,i. Also, the copy operation must be inhibited for those frames. On token ring networks, such as FDDI, each device that puts a dataframe on the network is responsible for removing (stripping) that dataframe. This is generally accomplished by observation of the source address SA in the dataframe, assuming that a node or station (e.g., bridge 12) only transmits dataframes with its own source address. But a bridge unit normally forwards dataframes with the source address other than its own. Since a bridge unit may have hundreds of dataframes on a large network at any one time, it is very difficult to track all the dataframes by their source addresses.

Accordingly, when implementing FDDI protocol, the transmit state machine 42 is constructed to incorporate a special combination of a frame counter (not shown) and strip node register (not shown) to accomplish frame tracking. When the arrival of the token at the bridge unit 12 is observed at the input port (I) of the media access controller 24, the transmit state machine 42 is so signalled, causing it to enter a token holding mode, resetting the frame counter and enabling counting. When the token is observed leaving the bridge unit 12, the transmit state machine 42 exits the token holding mode. While in the token holding mode, the frame counter (not shown) of the transmit state machine 42 is incremented for each dataframe that is observed leaving the media access controller 24 via the output port (O) (i.e., dataframes transmitted by the bridge 12). When the frame counter (not shown) is greater than zero, the transmit state machine 42 will also be in a "strip" mode, observing the arrival of each dataframe at the input port (I) of the media access controller 24, and decrementing the frame counter (not shown) when the arrival of a dataframe is observed. This, in effect, subtracts the number of dataframes that have been received by the media access controller 24 from the number of dataframes that have been transmitted by the media access controller. Thus, the value of the frame counter should equal the number of outstanding frames on the network A.

At the time the filter unit 28 enters the token holding mode, the only dataframes that will be observed at the input port (I) of the bridge 12, prior to receiving the dataframes that the bridge 12 transmitted itself, will be stripped frames. Stripped frames are frames that have a start delimiter but no end delimiter. Once the bridge 12 starts to receive its own dataframes on the network media 14, it would not see a stripped dataframe until after it sees another token. Thus, if no dataframes are lost, it would be sufficient to count end delimiters for an accurate count of received dataframes. But a bit error anywhere in the dataframe can cause that dataframe to be stripped by another node or bridge unit connected to the network media 14. To overcome this effect, at the time the token holding mode is entered by the filter unit 28, the transmit state machine 42 is configured to wait for the first end delimiter in order to decrement the frame counter (not shown), and at that time the dataframe monitoring logic switches such that the arrival of each start delimiter is then used to decrement the frame counter. For the special case where a start delimiter may be the object of a bit error, the filter unit 28 (i.e., the transmit state machine 42) will also recognize the occurrence of two end delimiters without an intervening start delimiter as a corrupt frame, and use this event to also decrement the frame counter (not shown). This process is accurate as long as the first frame transmitted is not the victim of a bit error that would cause it to be stripped. If there is such a bit error, the frame counter of the transmit state machine 42 would be one count higher than the number of outstanding dataframes on the network A. To prevent this situation from resulting in overstripping, the source address of each transmitted dataframe is stored in a strip node register (not shown) of the transmit state machine 42. While the frame counter (not shown) is greater than one, all dataframes received are stripped from the network. When the frame counter (not shown) equals 1, the next received dataframe will be stripped only if its source address SA matches that stored in the strip node register. The reason for this elaborate scheme is that the overstripping that would otherwise result will cause subsequent dataframes to be lost. During stripping, the receive state machine 44 is disabled.

Processor Interface

Overall control of the filter unit 28 is established by allowing the bridge process 34 (FIG. 2) access to certain of the registers of the filter unit 28. For this purpose, the processor write registers 52 and processor read registers 54 are provided. The bridge processor 34 can read or write a particular node identification from or to the RAM 64 by writing a record containing the appropriate information in a node identification field 94, together with appropriate information in the age, status and mode fields 96, 98, 100. This record is set in the processor write registers 52 and an interrupt signal issued by the bridge processor 34 to the filter state machine 90. The filter state machine, in turn, generates a database request. A portion of the processor write registers 52 is applied to the address translation logic 62 (via the MUX 50), and the RAM state machine 76 will access a list from the RAM 64 to search the next four records of the relevant list L for an address match. If a match is found, then that entry is read or written. If no match is found, then the first empty record in that link list is used to store the information desired by the bridge processor 34 to be stored.

Aging

As indicated above, records of the database DB are written with information in the age field 96 that is indicative of the time passed since the record was last accessed. Updating and deleting aged records is accomplished when the bridge processor 34 issues an age command via the processor write registers 52. The filter state machine 90 will cause the address counter 72 to be cleared, and initiate an age cycle via the RAM state machine 76. In turn, the RAM state machine 76, begins sequencing through each of the records R of the database DB, using the content of address counter 72 (applied to the RAM 64 via the MUX 70) as the access address. Each record R is accessed, and its age field entry compared to the value then contained by the age counter 80 via the age comparator 84. If the value of the age field 96 matches the content of the age counter 80, and the entry is a dynamic entry (i.e., learned by the filter unit 28 rather than added by the bridge processor 34), the status field 98 is set to indicate that the record is empty, and the record written back to the database DB.

If, on the other hand, the value of the age field 96 does not match that of the age counter 80, then no action is taken.

After this comparison cycle, the address counter 72 is incremented by the RAM state machine 76 to access the next 4-record list, and another comparison cycle performed as described. This process is repeated until the address counter 72 reaches its terminal count (as indicated, for example, by an overflow received by the RAM state machine 76). Then, the value in the age counter 80 is stored in the age latch 82 as a new time stamp, and the age counter is incremented by the RAM state machine 76.

Thus, the age cycle includes a scan of all records R contained in the database DB for entries having an age field that has not been updated in the last set of aging intervals. The filter unit 28 is designed with a 3-bit age counter to cycle the time stamp from 0 through 7. The bridge processor 34 issues an age command approximately every two seconds, resulting in the removal of a record R from the database DB in fifteen seconds, plus or minus one second, after the corresponding node 1, 2, . . . , i has ceased to use the network A. Since the rate of which the aging command is issued can be controlled by the bridge processor 34, virtually any aging period can be achieved with approximately a 12% resolution.

Database Maintenance

Maintenance of the database, that is, determining which entries (records) are to remain active, and writing new entries, is accomplished by examination of the source address SA of each dataframe received by the filter unit 28 from the network media 14. When the source address field SA of the received dataframe is found not to be contained in the database DB, irrespective of whether the dataframe is, or is not, to be copied from the network A to the network B, and the dataframe is valid, the filter unit 28 will create a record R corresponding to the source address SA and write that newly created record R to the database DB maintained by the RAM 64. The record R is written to the database DB with the mode bits indicating a dynamic entry, and the age field 96 is written with a value indicative of the current time stamp (i.e., the value contained in the age latch 82). In addition, the status bit of the record R is set to a state (e.g., "1") indicative of an active node.

On the other hand, if a search of the database DB reveals a record R corresponding to the source address field SA of the received dataframe, then the age field 96 of that record R is updated to the current value of the age latch 82.

During initial construction of the database DB by the learning process described above, chances are good that the database will not contain a record R corresponding the source node that originated a dataframe transmitted on the network media 14 bound for a destination node on that same network media. In such an instance, the filter 12 will erroneously indicate that to the associated media access controller 24 that the dataframe is to be non-productively copied to the sister media access controller 26 (FIG. 2) for re-transmission on the network media 16 (e.g., by assertion of the COPY signal from the filter state machine 90 on signal line 91). This could occur at initial start-up times, or during on-going operation if the particular source node 1, . . . , i is added to the network A, or moved from the network B to the network A, or the node becomes active after a period of inactivity longer the aging period (causing it to, in effect, be removed). However once such node becomes a source of a dataframe transmitted on the network A, a record will be written corresponding to such source node so that the any further dataframes destined for that node will not result in a non-productive copy to the network B (assuming the node remains active and is not again removed by the aging process).

Modes of Operation

The filter unit 28 is capable of several modes of operation, including a standard mode, dual mode, secure source address mode, secure destination address mode, and load sharing mode. Certain of these modes may incorporate other of the modes, as will be seen. Modes of operation will determine how the mode bits 100 in the database 92 are interpreted.

Standard Mode:

Records R that are written to the database DB may be of two basic types: dynamic or static. A dynamic record is one that is automatically entered and/or removed by the filter unit 28 via the learning process described above, and requires use of the age field 96 to determine if and when the record is to be removed. A static entry is one that is entered by the bridge processor 34, and is considered permanent. The two types are determined by the content of the mode field 100: a content of "0" indicates a dynamic record; any other content indicates that the record is a static entry. In this standard mode of operation, only records R corresponding to those nodes on the network media 14 with which the filter unit 28 is associated are stored in the database DB. Some stations may be of a type that receive only (e.g., a printer) and never send dataframes. In this case, and during this standard mode of operation, the filter unit 28 will never be able to learn of the node address since it never appears in the source address field of a dataframe. Therefore, the bridge processor 34 (FIG. 2) will need to enter the address in its associated database as a static entry (i.e., mode bits 100 set to a value of "1").

Dual Mode:

In the simple 2-port bridge as shown in FIG. 2, the destination port for forwarding is always the port that did not receive the dataframe. For more complex architectures such as a multiport bridge (not shown), it is beneficial to expand the database to include the destination port (where the dataframe must be forwarded). Therefore, it is convenient to allow the destination address to also be stored in the database. This information is not used by the filter unit 28 directly but by the bridge processor 34. The filter unit 28 must be able to differentiate between source and destination addresses, and the mode bits 100 are used for this purpose (i.e., a value of 2). When the destination address field DA of a received dataframe communicated on the network media 14 is found to correspond to a record R of the database DB, and the mode field 100 of that record R indicates that the corresponding node is a source node (i.e., resides on the network media 14 as part of the network A) the dataframe will be discarded (i.e., not copied to network B). If, on the other hand, the mode field 100 indicates that the destination address field DA of the dataframe (originating in network A) is not to be found in network A, the filter unit 28 will so signal the media access controller 24 to copy and forward the dataframe to the media access controller 26 of the network B (FIG. 2) for ultimate transmission to the destination node 1', . . . ,i' Records R of the database DB that are entered via the learning process are flagged as a "source" entry, i.e., the mode field 100 is set to indicate that the entry corresponds to a node in network A. In all other ways, the dual mode operates the same as the standard mode.

Secure Modes:

The information contained in the database DB on the various nodes in networks A and B permit the filter to exercise a certain modicum of security; that is, messages may be forwarded from one network to the other only if (1) the source node is authorized to use the bridge 12, and/or (2) the destination node on one of the networks (e.g., network B) is authorized to receive dataframes from another network (e.g., network A).

Thus, via the processor write registers 52, information can be written by the bridge processor 34 to place the filter unit 28 in a (1) secure source address mode, (2) secure destination address mode, or (3) both modes. In the secure source address or secure destination address modes, the filter unit 28 operates in the same manner as the standard mode, except as follows. In the secure destination address mode, if the record in the database DB corresponding to the destination address DA of the dataframe under analysis by the filter unit 28 is found, the mode control field 100 must be that of a destination class (i.e., a value of "2" or "10" binary), indicating that the corresponding destination is one that is authorized to receive dataframe from this network (i.e., network A). If the address is not found, or if the mode bits do not indicate a destination class, then the Copy command is not issued by the filter state machine 90.

In similar fashion, if the secure source address mode of operation is in effect, after the destination address DA is checked, the database DB is then searched for the occurrence of a record corresponding to the source address SA contained in the dataframe under analysis. If that record is found, the mode control bits of that record are looked at to determine if they are set to indicate that the node corresponding to the record found is authorized to communicate dataframes to the network B (i.e., the mode bits have a value of "1," indicating a source class). If not found, or if not a source class, the filter state machine 90 will withhold the Copy command, and the dataframe will, in essence, be discarded by the media access controller 24.

Load Sharing Mode:

The load sharing mode is independent of the other modes, and operates under the other modes. Load sharing involves the use of multiple bridge units 12, operating in parallel between, for example, the networks A and B (FIG. 1). Using multiple bridges to interconnect separate networks can significantly increase the performance of the overall network so formed.

Each bridge would be constructed substantially as described above, and each is responsible for a "set" of addresses; a bridge will not forward a dataframe, or learn from a dataframe, having a source address field SA that is not a member of that set. Since the address translation logic 62 operates to provide a linear grouping of addresses, it is only necessary to associate a group of link addresses to a particular bridge.

To simplify the logic, the four least significant bits of the link list number supplied by the address translation logic 72 are used to define 16 load share groups. Thus, the least significant four bits of the 14-bit output of the address translation logic 62 are coupled to a one-out-of-16 decoder 87 which operates to assert, for any applied 4-bit input, one and only one of the 16 outputs of the decoder 87 will be active. The processor write registers B2 will be supplied, by the bridge processor 34, with a 16-bit load share group identification. Each bit of the load share group identification contained in the processor write registers 52 of the particular bridge unit 12 will correspond to the stations for which it is responsible. For example, assume that the bridge unit 12 (FIG. 1) is two bridge units connected in parallel between the networks A and B. Assume further that the network A has sixteen stations to be shared equally between the two bridge units. In this case, the 16-bit load share group identification register (not shown) of the processor write registers 52 associated with one of the bridge units would have eight of the bit positions set to a state (e.g., "1") indicative of those stations (on Network A) for which it is responsible; the other bit positions would be set to an opposite state (e.g., "o"). Conversely, the 16-bit load share group identification register (not shown) of the parallel bridge unit would have its bit positions set just the opposite.

Thus, when the filter unit 28 of the particular bridge unit processes the source address of the dataframe, the output of the decoder 87 will be compared to the content of the load share group identification register (not shown) of the processor write registers 52 by the bit comparator 89, and if the corresponding bit in the processor write registers 52 is set (e.g., a "1"), then the bridge unit 28 recognizes that it is responsible for that address, and the bit comparator 89 will so signal the filter state machine 90.

A bridge unit will responsible for one or more load share groups, and no two bridges will be responsible for the same group. The bridge processor 34 will allocate the load share groups to the filter by setting the appropriate bits in the load share group identification register (not shown) of the processor write registers 52. If the load share group derived from the source address does not match the appropriate load share register bit, the filter state machine 90 will not issue the COPY signal to the media access controller 24, and the source address will not be learned by the filter unit 28.

When two networks are interconnected by parallel bridge units 12, a communication protocol exists between each bridge processor 34 of the bridge units. This protocol is used to allocate the load share groups, and distribute the database entries such that the database entries learned by all the parallel bridges are entered into the database by the bridge processor 34 as dynamic entries. This is done because a bridge unit 12 not responsible for forwarding a dataframe would not know if that dataframe originated on network A or if it originated on network B and was forwarded to the network A by a parallel bridge unit. The filter unit 28 must only learn addresses originating on network A.

What is claimed is:

1. A method of stripping dataframes communicated on an FDDI communications network by a network bridge device interconnecting first and second network configurations each comprising a plurality of data communication nodes for receiving and/or transmitting data in the form of dataframes that include a start delimiter, an end delimiter, and a source address data identifying a one of the plurality of nodes from which the dataframe originated, the method comprising the steps of:

maintaining a count for each dataframe transmitted on the first network by the network bridge device;

removing each dataframe received by the network bridge device on the first network if the count is non-zero; and decrementing the count first upon receipt of the first such dataframe having an end delimiter, and thereafter decrementing the count for each such succeeding dataframe received having a start delimiter.

2. The method of claim 1, wherein the removing step is performed only after the bridge unit receives a token dataframe symbolizing permission to transmit dataframes.

3. The method of claim 1, wherein the removing step comprises removing the end delimiter of each dataframe received if the count is non-zero.

4. The method of claim 1, including the steps of storing the source address contained in the last dataframe transmitted, comparing the source data contained in each received dataframe and the stored source address, and removing the received data frame only if the count is greater than one or the source data is the same as the stored source address and the count is one.

5. A method of removing dataframes from a token ring communication network by a communicating node coupled to the communications network, the dataframes being of a type having a start delimiter and an end delimiter, including maintaining a count of each dataframe transmitted on the communications network by the communicating node, removing each dataframe received by the communications node if the count is not zero, decrementing the count first upon the first dataframe received having an end delimiter, and thereafter decrementing the count for each dataframe having a start delimiter.

6. The method of claim 5, wherein each of the dataframe are of a type including source address data identifying a node originating such dataframe, the method including the step of storing the source address data of the last dataframe transmitted, and removing each dataframe received by the communications node if the count is greater than one or if the count is one and the source address data of the received dataframe matches the stored address data.

7. The method of claim 1, including the step of decrementing the count upon receipt of two immediately successive dataframes each having an end delimiter with no intervening dataframe having a start delimiter.

8. A method of stripping dataframes communicated on an FDDI communications network by a network bridge device interconnecting first and second network configurations each comprising a plurality of data communication nodes for receiving and/or transmitting data in the form of dataframes that include a start delimiter, an end delimiter, and a source address data identifying a one of the plurality of nodes from which the dataframe originated, the method comprising the steps of:

maintaining a count for each dataframe transmitted on the first network by the network bridge device;

decrementing the count first upon receipt of the first such dataframe having an end delimiter, and thereafter decrementing the count for each such succeeding dataframe received having a start delimiter;

storing the source address contained in the last dataframe transmitted; and removing the received data frame only if the count is greater than one or if the source data is the same as the stored source address and the count is one.

9. A method of removing dataframes from a token ring communication network by a communicating node coupled to the communications network, each of the dataframes containing source address data identifying a node originating such dataframe, including the steps of maintaining a count of each dataframe transmitted on the communications network by the communicating node, storing the source address data of the last dataframe transmitted, and removing each dataframe received by the communications node if the count is greater than one or if the count is one and the source address data of the received dataframe matches the stored address data.

10. The method of claim 9, wherein the dataframes each contain a start delimiter and an end delimiter, and including the step of decrementing the count first upon the first received dataframe having and end delimiter, and thereafter, decrementing the count for each dataframe having a start delimiter.

* * * * *